(No Model.)
J. W. HYATT.
ART OF FILTERING WATER.
No. 293,882. Patented Feb. 19, 1884.
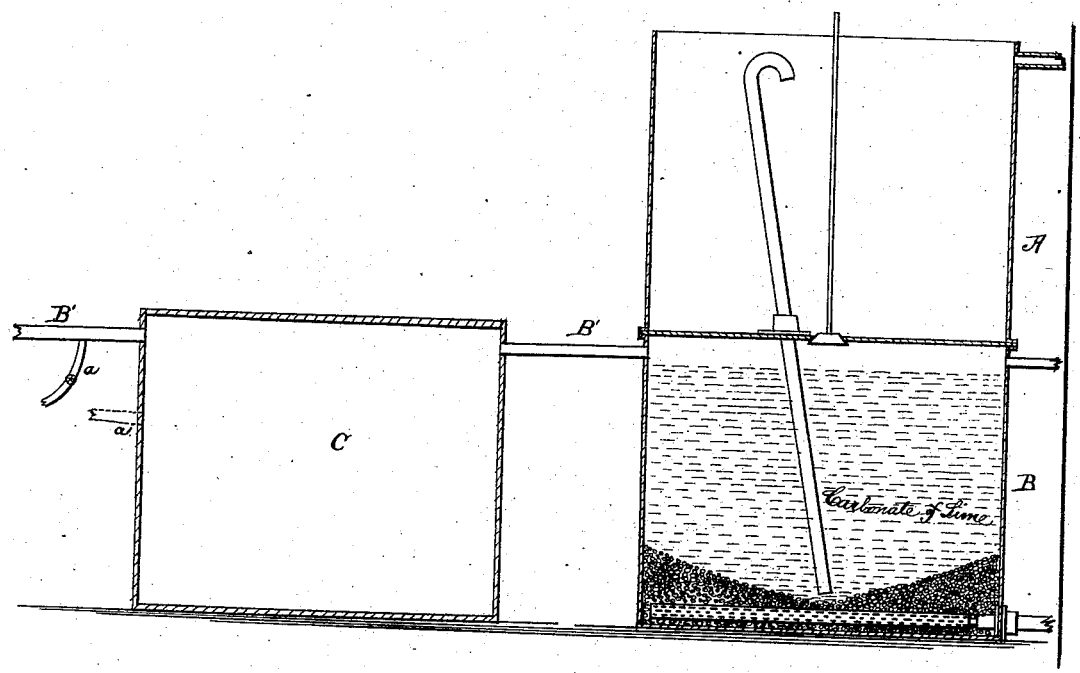
WITNESSES:
INVENTOR
John W. Hyatt,
BY
Chas. C. Gill
ATTORNEY

UNITED STATES PATENT OFFICE.

JOHN W. HYATT, OF NEWARK, NEW JERSEY.

ART OF FILTERING WATER.

SPECIFICATION forming part of Letters Patent No. 293,882, dated February 19, 1884.

Application filed January 29, 1884. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Filtering Water, of which the following is a specification.

The invention relates to improvements in the methods of filtering water where it is desirable to combine the use of a coagulating element with mechanical filtration, one such method being described in my application for Letters Patent filed November 3, 1883, and numbered 110,742.

In the practice of my present invention I make use of the apparatus shown and described in said application, which apparatus is constructed on the principle of the filter patented to me March 6, 1883, by Letters Patent No. 273,542. I prefer the employment of said apparatus, and illustrate a simple form thereof in the accompanying drawing, in which A B denote the upper and lower compartments of the filter; B', the supply for unfiltered water, and C an intermediate tank into which the unfiltered water may flow, and thence pass into the filter. The tank C, I use for convenience and economy, as will hereinafter appear.

In giving effect to my invention I first inject into the water a coagulating material—such as sulphate of iron—and then pass the water through a filter-bed composed of carbonate of lime, or carbonate of lime and sand (or other granular substance) mixed, the purpose of passing the water through the bed being to prevent any of the coagulating substance from passing off in solution with the water, and to mechanically arrest the impurities. The coagulating material may be injected into the pipe B' through a pipe, $a$, or into the tank C through a pipe, as indicated in dotted lines, during the flow of the water to the filter, and any suitable injecting or pumping device—for example, such as that shown in my said application No. 110,742—may be employed for supplying the said material. The purpose of the tank is to permit the coagulant to have a longer time to act upon the impurities in the water than it would have if the pipe B extended direct from the supply of unfiltered water to the filter. When the tank C is employed, I have found that a smaller quantity of the coagulating material may be used than when it is not, and hence it will be noted that the tank may be advantageously employed, but that it is not essential to the successful operation of the invention. The tank may be of sufficient size to contain as much water as the filter will pass in about fifteen minutes, or larger; but whether it is employed or not there will be no interruption of the flow of water into the filter. It will be understood, however, that, if desired, a large settling-tank may be employed, into which the water and coagulant may remain a given length of time, and afterward passed through the filter-bed containing carbonate of lime, this being an intermittent process as contradistinguished from a continuous process, such as that hereinbefore described. The quantity of the coagulant employed will depend upon the nature of the impurities to be arrested and other circumstances. In water like that of the Mississippi river, containing clay, from one to three grains of sulphate of iron in solution will be sufficient for each gallon of water when filtered through a bed such as that herein described. The carbonate of lime for the filter-bed may be in the form of granulated marble, or of oyster or other molluscan shells crushed or broken into granules of a size, preferably, that will pass through a sieve containing one-quarter-inch meshes. The filter-bed composed of carbonate of lime, or carbonate of lime mixed with other filtering agent, will effectually arrest the impurities, and will prevent the passage of iron in solution from the filter with the water.

What I claim as my invention, and desire to secure by Letters Patent, is—

1. In the art of filtration, the continuous method hereinbefore described of coagulating and arresting the impurities and of preventing any of the coagulating material from passing off in solution with the filtered water, which method consists in introducing a coagulant into the unfiltered water, and then passing the same through a filter-bed containing carbonate of lime.

2. In the art of filtration, the continuous method hereinbefore described of coagulating and arresting the impurities and of preventing any of the coagulating material from passing off in solution with the filtered water, which method consists in introducing a coagulant into the unfiltered water, and then passing the same through an intermediate tank into a filter-bed containing carbonate of lime.

3. In the art of filtration, the method hereinbefore described of coagulating and arresting the impurities and of preventing any of the coagulating material from passing off in solution with the filtered water, which method consists, first, in introducing the coagulant and unfiltered water into a tank; second, allowing it to settle therein, and, third, passing it through a filter-bed containing carbonate of lime.

Signed at New York, in the county of New York and State of New York, this 28th day of January, A. D. 1884.

JOHN W. HYATT.

Witnesses:
  CHAS. C. GILL,
  HERMAN GUSTOW.